United States Patent [19]

Mansfield et al.

[11] Patent Number: 5,333,233
[45] Date of Patent: Jul. 26, 1994

[54] APPARATUS FOR BONDING DISCRETE OPTICAL FIBERS INTO A RIBBON

[75] Inventors: Charles M. Mansfield; Victor J. Borer, both of Austin, Tex.

[73] Assignee: Minnesota Mining and Manufacturing Company, St. Paul, Minn.

[21] Appl. No.: 932,068

[22] Filed: Aug. 19, 1992

[51] Int. Cl.$^5$ .............................. G02B 6/00; G02B 6/36
[52] U.S. Cl. ...................................... 385/134; 385/114
[58] Field of Search ................... 385/114, 134, 78, 56, 385/135, 136, 71, 54

[56] References Cited

U.S. PATENT DOCUMENTS

| | | | |
|---|---|---|---|
| 4,355,865 | 10/1982 | Conrad et al. | 385/114 |
| 4,468,089 | 8/1984 | Brorein | 385/114 |
| 4,496,215 | 1/1985 | Shaheen et al. | 385/114 |
| 4,778,243 | 10/1988 | Finzel | 385/71 X |
| 5,037,179 | 8/1991 | Bortolin et al. | 385/54 |

OTHER PUBLICATIONS

Siecor Brochure "Siecor ® Fibert Organizer Tape Application (FOTA) Instructions". Issue 2 Jun. 1991.

*Primary Examiner*—Akm E. Ullah
*Attorney, Agent, or Firm*—Gary L. Griswold; Walter N. Kirn; Jack V. Musgrove

[57] ABSTRACT

A tool for converting several discrete optical fibers into a ribbon format. The tool includes a base and two shims, one shim being fixed to the base and the other being slidably attached to the base but parallel with the fixed shim, and a spring to bias the sliding shim toward the fixed shim. The fibers may be laid between the shims while the sliding shim is held in a retracted position away from the fixed shim. When the sliding shim is moved toward the fixed shim, the fibers become tightly packed against each other. A piece of tape may then be applied to the fibers, bonding them into a fiber ribbon. A blade assembly is designed to slide along two rails, one rail being attached to each of the shims, the blade assembly having a flexible blade which is positioned with respect to the rails whereby the blade forcibly abuts the straight edge of the shims. In this manner, as the blade assembly slides along the rails, the blade carefully trims the excess tape very close to the outlying fibers, but without damaging the fibers.

21 Claims, 3 Drawing Sheets

APPARATUS FOR BONDING DISCRETE OPTICAL FIBERS INTO A RIBBON

BACKGROUND OF THE INVENTION

1. Field of the Invention

The present invention generally relates to tools used to handle or bond thin filaments, and more particularly to a tool used to form a plurality of discrete optical fibers into a ribbon format.

2. Description of the Prior Art

In recent years, fiber optic cables have replaced traditional copper wire as the preferred medium for telecommunications. As with copper wires, it is often necessary to splice optical fibers together, either for new installations, or for the repair or replacement of existing cables. The present invention relates to a tool used in such splicing operations.

In the past nearly all optical fibers were packaged in discrete form, i.e., a fiber optic cable typically included four to twelve fibers loosely bundled in a buffer tube. When the fibers were to be spliced with another set from a different cable, it was necessary to separately splice each fiber, either mechanically or by fusion splicing. Today, optical fibers are often constructed in a ribbon format, usually consisting of two to twelve fibers bonded together and lying in a common plane. The provision of such fiber ribbons simplifies the splicing operation, since all fibers may simultaneously be stripped, cleaved and spliced to another ribbon. See, e.g., the multiple optical fiber mechanical splicing system disclosed in U.S. patent application Ser. No. 07/753,333, assigned to Minnesota Mining and Manufacturing Co. (3M-assignee of the present invention).

As fiber ribbons and related splicing systems become more widely deployed, it becomes more desirable to be able to easily and quickly transform a bundle of discrete fibers into a ribbon format, for two reasons. First, when the fibers are formed into a ribbon, they can be more economically spliced en masse. Secondly, when it is necessary to splice a plurality of pre-existing discrete fibers to a new fiber ribbon, it is preferable to make the discrete fibers compatible with the ribbon format to take advantage of the economies of mass splicing, rather than separating out the fiber ribbon into individual fibers and making several discrete splices. The latter approach is very time consuming, and results in a large volume of splice bodies which add cost and crowd splice trays which keep the fibers organized.

In the construction of fiber ribbons, a bonding layer such as adhesive tape may be used to join the individual fibers after they are buffer coated and prior to placement in a lightguide cable. For example, the ASR fiber ribbon sold by American Telephone & Telegraph (ASR is a trademark of AT&T), uses a polyester-backed adhesive tape. This technique is, however, highly unsuited for field ribbon construction operations, as the machinery was developed for factory manufacturing.

One technique which may be used in the field involves the direct application of an adhesive material to the optical fibers, such as is used in the multi-fiber arrangement tool of Alcoa-Fujikura Ltd. This procedure is still inadequate, however, since the adhesive is difficult to apply in a uniform coating, and the resulting ribbon often has gaps between the fibers, and the fibers may not be completely bonded together, rendering them unsuitable for the splicing operation. It would, therefore, be desirable and advantageous to devise a tool which would simplify the bonding together of a plurality of optical fibers into a ribbon format, to facilitate mass splicing of the fibers. The tool should ensure that the fibers are positioned uniformly with no gaps, that they remain undamaged, that they are adequately bonded together, and that the resulting ribbon has a uniform width with no overhanging edges of tape.

SUMMARY OF THE INVENTION

The present invention provides a tool for joining a plurality of discrete optical fibers into a ribbon cable and comprises two shims mounted on a planar surface base, one of the shims being fixed and the other sliding, and means for biasing the sliding shim toward the fixed shim. The shims have straight edges for aligning the fibers, and the edges have ramp-defining curves at their ends to facilitate location of a tape-cutting blade. With the sliding shim held in an open position, the fibers are laid onto the base, under swinging arms proximate the fixed shim. When the sliding shim is released, the fibers are held in tight, longitudinal abutment. After smoothing the fibers, a strip of pressure-sensitive adhesive tape may be placed on top of the fibers. The tape is trimmed by sliding a flexible blade between the edge of each shim and the adjacent fiber; the blade's location may be controlled by providing guide rails supporting a blade holder, and by utilizing the ramp-defining curve to slightly bend the blade into proper position. This tool provides a method for placing the fibers in a ribbon array, for easily applying the adhesive tape, and for precisely trimming the tape.

BRIEF DESCRIPTION OF THE DRAWINGS

The novel features of the invention are set forth in the appended claims. The invention itself, however, will best be understood by reference to the accompanying drawings, wherein:

DESCRIPTION OF THE PRESENTLY PREFERRED EMBODIMENT

Figure 1:
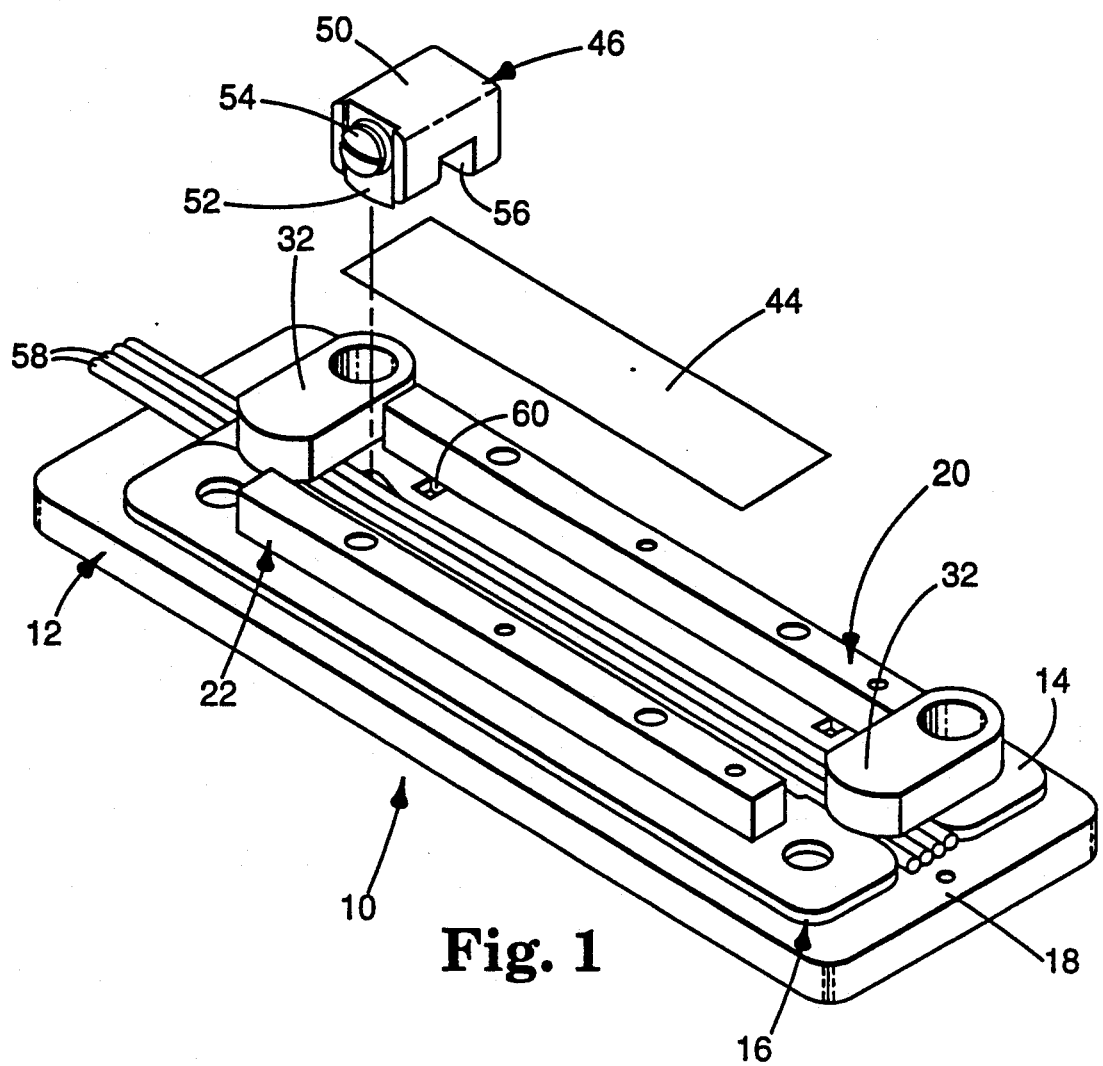
FIG. 1 is a perspective view of the tool of the present invention.
Figure 2:
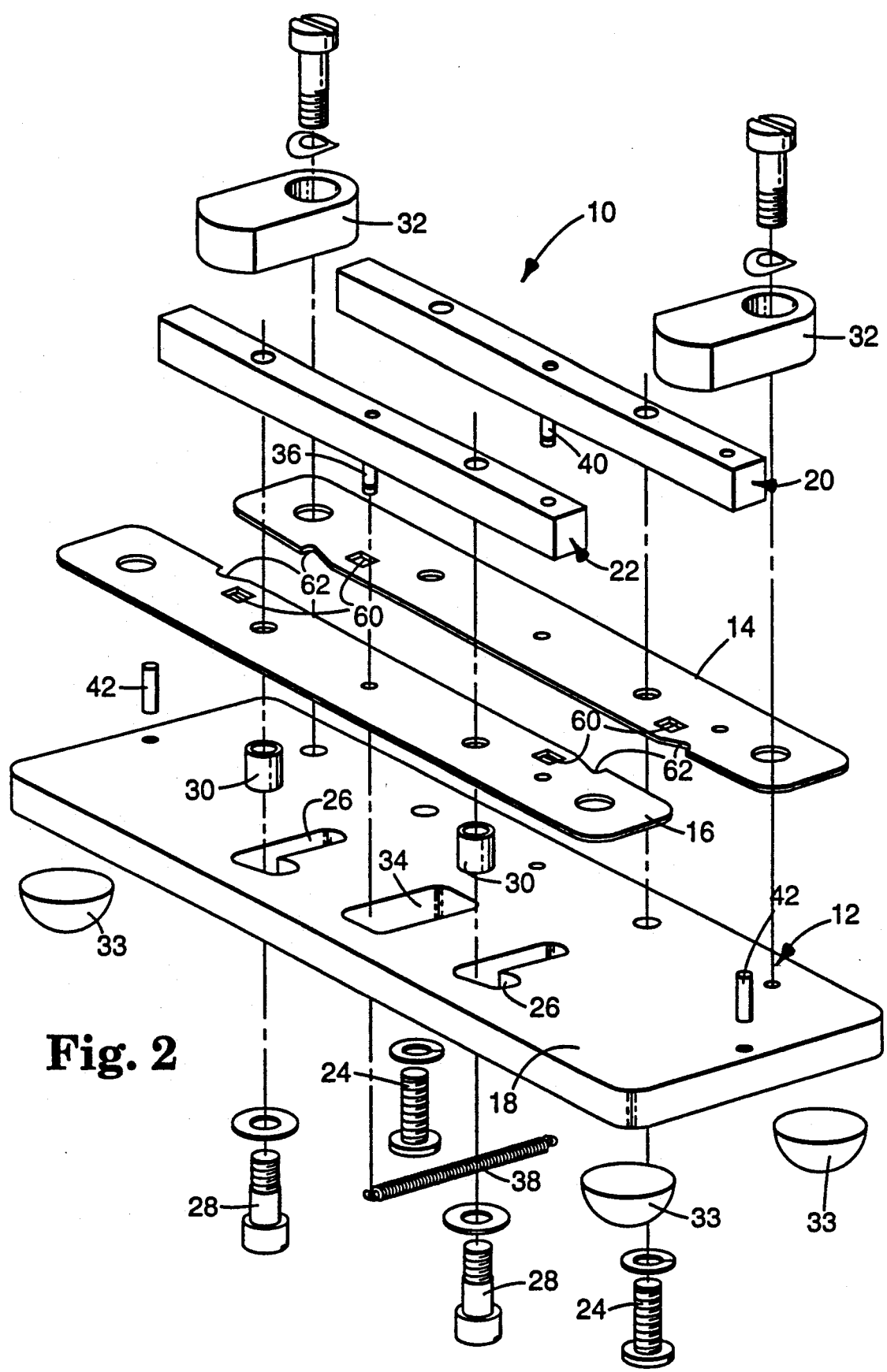
FIG. 2 is an exploded perspective view of the tool.

With reference now to the figures, and in particular with reference to FIGS. 1 and 2, there is depicted the tool 10 constructed according to the present invention. Tool 10 is generally comprised of a base 12 having a pair of plates or shims 14 and 16 mounted on a planar work surface 18 of base 12, the shims having straight edges in opposed relationship. Each shim has a corresponding bar or rail 20, 22, respectively. Rail 20 and shim 14 are affixed to base 12 by any convenient means, such as screws 24. Rail 22 and shim 16 are slidably attached to work surface 18, also by any convenient means, such as the provision of slots 26 in base 12 through which pass shoulder screws 28 and bearings 30. Arms 32 are pivotally attached to work surface 18, one at each end of shim 14. Feet or pads 33 may also be attached to the lower surface of base 12.

Base 12 also has an opening 34 through which passes a pin 36. Pin 36, which is connected to rail 22 and passes through shim 16, is attached to one end of a spring 38. The other end of spring 38 is fixed with respect to base 12, by any convenient means. In the illustrated embodiment, the other end of spring 38 is attached to another pin 40 which is connected to rail 20 and passes through shim 14 and base 12. Spring 38 biases shim 16 toward shim 14. Slots 26 extend generally perpendicular to the shims and rails, and are preferably L- or J-shaped (or reverse J-shaped, as shown in the figures) whereby shim 16 may be held in a retracted state by pushing it away from shim 14, and then to the side.

In the illustrated embodiment, shims 14 and 16 are identical, as are rails 20 and 22, and arms 32, to reduce manufacturing cost. The base, shims, rails, and arms may all be constructed from any durable material, preferably corrosion-resistant stainless steel. Posts may also be provided to maintain proximity of the optical fibers with shim 14 prior to release of shim Tool 10 preferably includes several accessories, including an ample supply of adhesive tape strips 44, a blade assembly 46, and a pair of tweezers 48 (see FIG. 4). Strips 44 may be formed from any durable adhesive tape, preferably one of the "800" series of pressure-sensitive adhesive tapes sold by 3M. The strips may be provided precut to length and placed on a peel-off release liner. Blade assembly 46 includes a blade holder 50, a tape-cutting blade 52, and means for attaching the blade to the blade holder, e.g., a screw 54 (see FIG. 5). Blade holder 50 has a groove 56 which rests on rails 20 or 22 for guiding blade holder 50.

The dimensions of tool 10 and its various components are variable depending upon the particular application. In the preferred embodiment, where tool 10 is designed to form a ribbon from two to twenty-four fibers each having an approximate diameter of 0.25 mm, the following approximate dimensions are exemplary. Base 12 is 18.0 cm×6.3 cm×0.74 cm. Slots 26 are 2.4 cm×0.66 cm, and opening 34 is 2.4 cm×1.2 cm. The lower portion of slots 26, for retaining shim 16 in the retracted position, extend at an angle of 15° from the main length of slots 26 for a length of 0.63 cm. Shims 14 and 16 are 15.6 cm×21.2 cm×0.25 mm, and rails and 22 are 11.4 cm×0.76 cm×0.76 cm. Arms 32 are 3.18 cm×1.67 cm×0.93 cm. Spring 38 has a relaxed length of 1.59 cm, and may be purchased from Lee Spring Co. under part number EI-010B-4. Blade holder 48 is 2.08 cm ×1.59 cm×1.57 cm, and groove 54 is 0.77 cm wide (i.e., just slightly wider than the rails) and 0.79 cm deep. Blade 50 is 1.52 cm×1.07 cm×0.10 mm, preferably made of blue tempered and polished spring steel with a Rockwell-C hardness of about 48 or harder. The cutting edge of blade 50 has a compound bevel, with a flat area of about 1.27 mm and a 40° angle leading to the flat (see the further discussion below). Tape strips 44 are 8.9 cm×1.3 cm.

Operation

Figure 3:
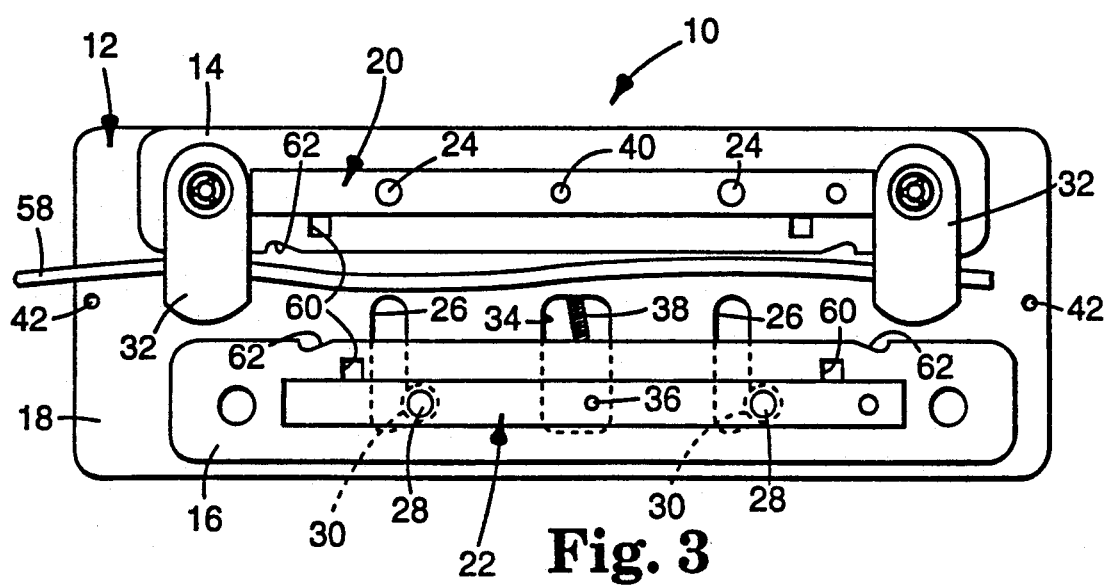
FIG. 3 is a top plan view of the tool, depicting the placement of an optical fiber onto the tool while the sliding shim in its retracted state.
Figure 4:
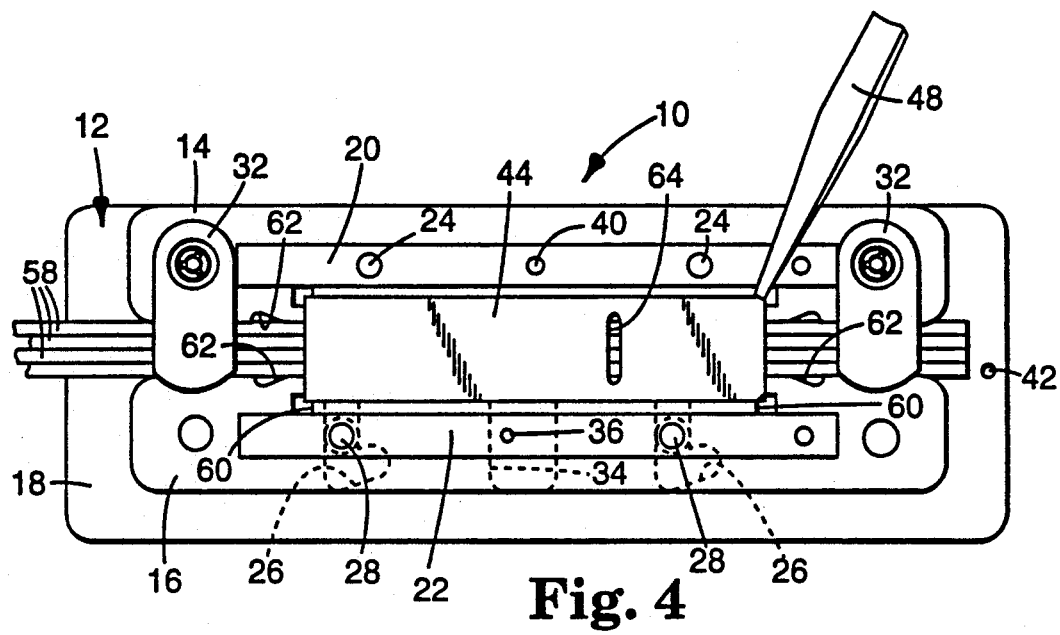
FIG. 4 is a top plan view of the tool, depicting the sliding shim in its relaxed state, packing a plurality of fibers against the fixed shim, with a strip of adhesive tape overlying the fibers.
Figure 5:
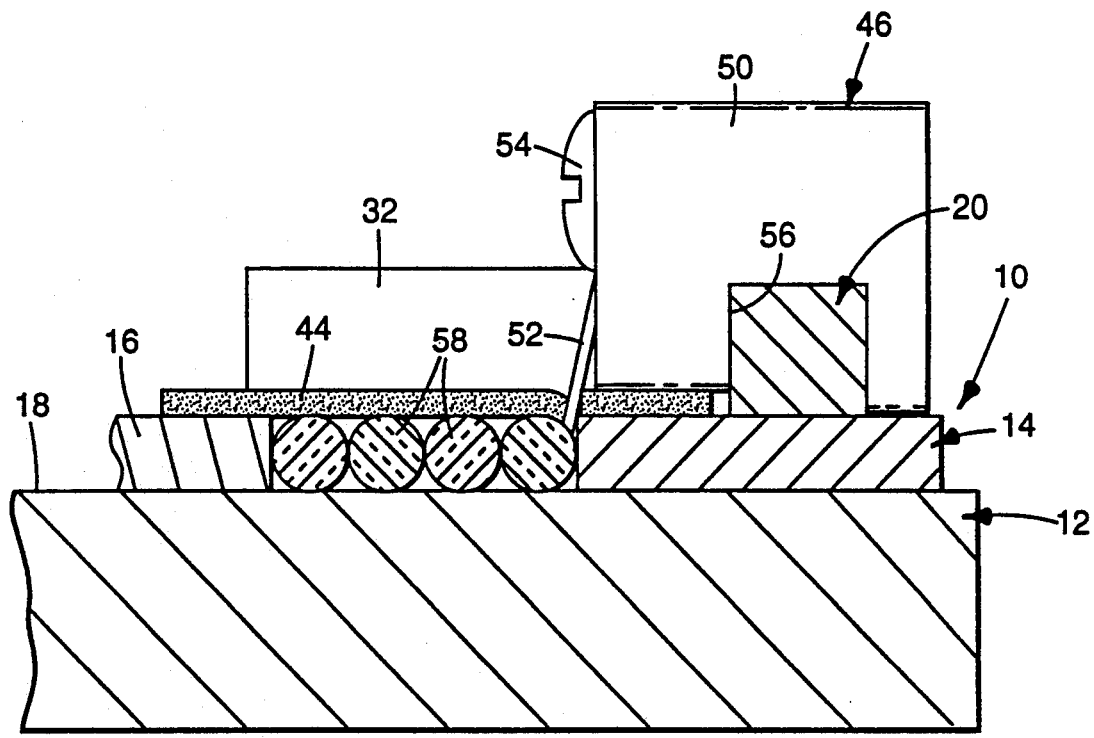
FIG. 5 is a cross-sectional side view of the tool depicting operation of the flexible tape-cutting blade.

The operation of tool 10 may best be understood with reference to FIGS. 3–5. First, the individual fibers 58 are made accessible by removing a portion of the sheath of the lightguide cable in accordance with the practices for that particular cable; several centimeters of the fibers should be made available to simplify handling. Any gel surrounding the fibers is removed. The first fiber to be included in the ribbon is selected, e.g., according to the proper color sequence. Each fiber is cleaned, such as with alcohol and a lint-free pad, prior to placement in tool 10. Shim 16 must be moved to its retracted position (FIG. 3), then each fiber 58 is placed proximate against the straight edge of shim 14 or sequentially proximate the preceding fiber (the width of the fibers is exaggerated in the figures for clarity). The length of the fibers should lie between shim 14 and posts 42, and the ends should extend beyond the relevant arm 32. After the desired number of optical fibers are inserted, they should be flattened out to ensure that they are not crossing over one another, i.e., by gently rubbing a finger against them. Shim 16 is then moved (to the left in the figures) to release it, and spring 38 causes shim 16 to move toward shim 14. Any fibers which buckle or warp are again smoothed. The fibers are now held between shims 14 and 16, and lightly packed into a flat, uniform array.

A strip 44 of the adhesive tape is removed from the peel-off liner, and placed over the fibers, partially overlapping onto the shims. Shims 14 and 16 may be provided with indicia at each end, such as square cut holes 60, for indicating the desired location of strip 44, i.e., the edges of strip 44 should lie within holes 60. It is not necessary that strip 44 be perfectly aligned with the fibers, due to the next trimming step, although some portion of the tape must completely overlie the fibers in the area defined between holes 60. Care should be taken to make sure that the tape is applied evenly, without any bubbles or creases.

In the trimming of strip 44, it is important that the tape be trimmed as flush as possible against the outermost fibers, without damaging the fiber coating. In the present invention, this is accomplished by providing a blade 52 which is flexible, and which is located at a distance from groove 56 which is slightly less (e.g., 0.025–0.5 mm) than the distance from rail 20 to the straight edge of shim 14. In order to initially position blade 52, blade assembly 46 is first located at either end of rail 20, against one of the arms 32. In this location, the cutting edge of blade 52 is lowered into a ramped region 62 defined by a curving of the edge of shim 14. In other words, at least one end of the straight edge of each shim curves away from the other shim, to define blade ramps 62 (it is desirable, but not necessary, to provide ramps 62 at both ends of each shim). In this manner, as blade assembly 46 slides along rail 20, ramp 62 forces the thin cutting edge of blade 52 to flex slightly and move outwardly to the edge of shim 14, as shown in FIG. 5, where it remains in forcible abutment with the straight edge while it slices the tape. Thus, the blade is essentially spring-loaded against the edge of shim 14, and so trims the tape as closely as possible without contacting the fibers. The cutting edge of blade 52 is preferably beveled, which not only produces a sharper edge for cutting the tape, but also acts as a wedge when the blade is forced between the fiber and the edge of the shim. Blade 52 is furthermore preferably angled toward the cutting edge, to produce a higher shear stress on the tape. The angled and beveled cutting edge also serve to roll the trimmed edge of the tape downwardly over the fiber, imparting better adhesion.

This procedure is repeated to trim the tape at the edge of shim 16. Those skilled in the art will appreciate that the distance from rail 22 to the straight 10 edge of shim 16 is approximately equal to the distance from rail 20 to the straight edge of shim 14, so a single blade assembly may be used with both rails. The excess tape may be removed using tweezers 48. The holes 60 facilitate removal of the tape by providing means for the tweezers to pass under the excess tape. Arms 32 may then be swung out and the fiber ribbon removed. Several strips of tape may be serially applied if it is desired to make a ribbon over a large length of the fibers. Tape may be applied to both sides of the ribbon, but this is not necessary.

The tool of the present invention thus possesses several benefits, the primary one providing a simple method of bonding together a plurality of optical fibers into a ribbon format, to facilitate mass splicing of the fibers. In the ribbon so formed, the fibers are uniformly juxtaposed in parallel relationship with no gaps between the fibers, and remain undamaged by the tape-trimming process, yet they are strongly bonded together, and have no overhanging tape edges. The ribbon is also formed with a uniform, repeatable width. As a further improvement, tape 44 may be provided with a transverse slot 64 to facilitate stripping of the fibers prior to the splicing operation. When the fibers are bonded together, slot 64 creates a gap near the end of the resulting ribbon. This gap makes stripping of the fiber coatings easier, especially with flat-edged stripping tools which otherwise would not necessarily cut through the tape layer. The gap also serves as a reference location for the stripping operation. As a further improvement, tape 44 may be provided with many evenly spaced slots 64 to allow more flexibility of the finished ribbon.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

I claim:

1. A device for uniting a plurality of individual fibers into a ribbon, comprising:
    a base member having a work surface;
    a first plate member having a straight edge, said first plate member being affixed to said work surface of said base member, and said straight edge having first and second ends;
    a second plate member having a straight edge, said second plate member being slidably attached to said work surface of said base member, and said straight edge of said second plate member having first and second ends, and being proximate said straight edge of said first plate member;
    means for biasing said second plate member toward said first plate member; and
    said first end of said straight edge of said first plate member curving away from said second plate member, defining a first blade ramp, and said first end of said straight edge of said second plate member curving away from said first plate member, defining a second blade ramp.

2. The device of claim 1 further comprising means for retaining the fibers on said work surface.

3. The device of claim 1 further comprising:
    a first rail member attached to said first plate member; and
    a second rail member attached to said second plate member.

4. The device of claim 1 further comprising blade means for cutting a strip of tape applied to the fiber along each of said straight edges.

5. The device of claim 1 further comprising means for retaining said second plate member in a retracted position away from said first plate member.

6. The device of claim 1 wherein each of said first and second plate members have means for indicating a desired location of a strip of tape to be applied to the fibers.

7. The device of claim 1 further comprising a strip of tape adapted to be placed on the optical fibers which are located between said first and second plate members.

8. The device of claim 2 wherein said retaining means comprises first and second arm members, said first arm member being pivotally attached to said base member proximate a first end of said first plate member, and said second arm member being pivotally attached to said base member proximate a second end of said first plate member.

9. The device of claim 3 further comprising:
    a blade holder having a groove for sliding along either of said first or second rail members; and
    a blade attached to said blade holder, said blade having a cutting edge whose distance from said groove is slightly less than the distance from said first rail member to said first straightedge of said shim.

10. The device of claim 7 wherein said strip of tape has a slot therein, extending transversely across said strip.

11. The device of claim 9 wherein said blade is formed from a flexible metal and has a beveled edge.

12. A tool for forming a plurality of discrete optical fibers into a ribbon format, comprising:
    a base member having a planar work surface;
    a first shim affixed to said work surface of said base member, said first shim having a straight edge;
    a second shim slidably attached to said work surface of said base member, said second shim having a straight edge which is generally parallel to and proximate said straight edge of said first shim;
    means for biasing said second shim toward said first shim;
    a first rail member attached to said first shim, said first rail member being generally parallel with said straight edge of said first shim;
    a second rail member attached to said second shim, said second rail member being generally parallel with said straight edge of said second shim, and said second rail member being located at a distance from said straight edge of said second shim which is approximately equal to the distance from said first rail member to said straight edge of said first shim;
    a blade holder having a groove for resting on either of said first or second rail members; and
    a blade attached to said blade holder, said blade having a cutting edge spaced from said groove sufficiently to bias said cutting edge against said straight edge of said first shim.

13. The device of claim 12 further comprising means for retaining said second shim in a retracted position away from said first shim.

14. The device of claim 12 wherein said blade is formed from a flexible metal and has a beveled edge.

15. The device of claim 12 further comprising a strip of tape adapted to be placed on the optical fibers which are located between said first and second shims.

16. The device of claim 15 wherein said strip has a slot extending transversely across said strip.

17. A kit for converting a plurality of discrete optical fibers into a fiber ribbon, comprising:
a tool comprising
a generally rectangular base having a work surface and a lower surface, and having an opening therein,
a first shim affixed to said work surface of said base member, said first shim having a straight edge, said straight edge terminating in ramp-defining curved portions,
a second shim, essentially identical to said first shim, slidably attached to said work surface of said base member, said second shim having a straight edge which is generally parallel to and proximate said straight edge of said first shim, said straight edge of said second shim also terminating in ramp-defining curved portions, said second shim further having a pin extending through said opening of said base, said first and second shims having a thickness which is approximately equal to the diameter of the optical fibers, and having a hole at each end thereof,
a spring having first and second ends, said first end being attached to said pin of said second shim, and said second end being attached to said lower surface of said base;
a first rail attached to said first shim, said first rail member being generally parallel with said straight edge of said first shim;
a second rail, essentially identical to said first rail, attached to said second shim, said second rail member being generally parallel with said straight edge of said second shim, and said second rail member having a width which is approximately equal to the width of said first rail member, and being located at a distance from said straight edge of said second shim which is approximately equal to the distance from said first rail member to said straight edge of said first shim,
means for retaining said second shim in a retracted position away from said first shim,
first and second arm members, said first arm member being pivotally attached to said base proximate a first end thereof, and said second arm member being pivotally attached to said base proximate a second end thereof,
a blade holder having a groove for resting on either of said first or second rail members, said groove having a width which is slightly larger than said width of said first rail member, and
a flexible blade attached to said blade holder, said blade having a beveled cutting edge whose distance from said groove is slightly less than said distance from said first rail member to said first straight edge of said first shim;
a plurality of strips of tape, each said strip having a length which is slightly shorter than the length of said straight edges of said first and second shims, and having a width which is no wider than the distance between said first and second rails when said second shim is in said retracted position; and
tweezer means for removing excess tape from said shims, said excess tape being trimmed from one of said strips of tape applied to optical fibers lying between said shims.

18. A device for uniting a plurality of individual fibers into a ribbon comprising:
a base member having a work surface;
a first plate member having a straight edge, said first plate member being affixed to said work surface of said base member;
a second plate member having a straight edge, said second plate member being slidably attached to said work surface of said base member, and said straight edge of said second plate member being approximate said straight edge of said first plate member;
means for biasing said second plate member toward said first plate member; and
means for retaining the fibers on said work surface said retaining means including first and second arm members, said first arm member being attached to said base member proximate a first end of said first plate member, and said second arm member being attached to said base member proximate a second end of said first plate member.

19. A device for uniting a plurality of individual fibers into a ribbon, comprising:
a base member having a work surface;
a first plate member having a straight edge, said first plate member being affixed to said work surface f said base member;
a second plate member having a straight edge, said second plate member being slidably attached to said work surface of said base member, and said straight edge of said second plate member being proximate said straight edge of said first plate member;
means for biasing said second plate member toward said first plate member;
a first rail member attached to said first plate member;
a second rail member attached to said second plate member;
a blade holder having a groove for sliding along either of said first or second rail members; and
a blade attached to said blade holder, said blade having a cutting edge whose distance from said groove is slightly less than the distance from said first rail member to said first straight edge of said shim.

20. The device of claim 19 wherein said blade is formed from a flexible metal and has a beveled edge.

21. A device for uniting a plurality of individual fibers into a ribbon, comprising:
a base member having a work surface;
a first plate member having a straight edge, said first plate member being affixed to said work surface of said base member;
a second plate member having a straight edge, said second plate member being slidably attached to said work surface of said base member, and said straight edge of said second plate member being proximate said straight edge of said first plate member;
means for biasing said second plate member toward said first plate member; and
a strip of tape adapted to be placed on the optical fibers which are located between said first and second plate members, said strip of tape having a slot therein, extending transversely across said strip.

* * * * *